United States Patent [19]

Harland

[11] Patent Number: 5,791,370
[45] Date of Patent: Aug. 11, 1998

[54] APPARATUS FOR SUPPLYING AND CONTINUOUSLY CIRCULATING FLUID

[76] Inventor: Robert P. Harland, 3059 N. Summit Ave., Milwaukee, Wis. 53211

[21] Appl. No.: 753,918

[22] Filed: Dec. 3, 1996

[51] Int. Cl.$^6$ .............................. F16K 49/00; F28D 15/00
[52] U.S. Cl. ...................... 137/340; 137/334; 137/341; 137/565; 165/104.19; 165/142
[58] Field of Search ....................... 165/142, 104.19; 137/564, 340, 334, 341, 565

[56] References Cited

U.S. PATENT DOCUMENTS

| | | | |
|---|---|---|---|
| 350,568 | 10/1886 | Strobel | 137/340 |
| 874,991 | 12/1907 | Frien | 165/142 |
| 1,953,611 | 4/1934 | Jardine | 137/340 |
| 2,932,313 | 4/1960 | Noland | 137/564 |
| 3,319,709 | 5/1967 | Strunk | 165/142 |
| 4,425,936 | 1/1984 | Goss | 137/340 |
| 4,694,896 | 9/1987 | Navratil | 165/142 |

*Primary Examiner*—A. Michael Chambers
*Attorney, Agent, or Firm*—Whyte Hirschboeck Dudek S.C.

[57] ABSTRACT

An apparatus for supplying fluid comprising a fluid source, valve, inside tube and outside tube. The outside tube is in open communication with the fluid source and the valve. The inside tube is located within the outside tube. The inside tube is in open communication with the fluid source on one end and is spaced apart from the valve on the opposite end so that warm lower density fluid from the fluid source flows up through the inside tube displacing cool higher density fluid near the valve. The cool higher density displaced fluid is forced by gravity back to the fluid source in a fluid return path located between the inside tube and the outside tube. When the valve is in the closed position for an extended period of time, the apparatus maintains a continuous fluid flow from the fluid source through the inside tube to a location near the valve. When the valve is opened warm fluid flows immediately through the valve saving both time and fluid. This circulation continues until thermal equilibrium between the ambient air and the fluid in the fluid source is achieved. A heater may be placed in thermal communication with the fluid source in order to maintain the temperature of the fluid within the fluid source at a desired temperature. A pump may also be added to convert the apparatus from passive to active. The pump is placed in communication with the fluid source and inside tube only.

12 Claims, 5 Drawing Sheets

APPARATUS FOR SUPPLYING AND CONTINUOUSLY CIRCULATING FLUID

BACKGROUND OF THE INVENTION

This invention relates to an apparatus for supplying and continuously circulating fluid from a fluid source to an area near a valve when the valve is in a closed position. The continuous circulation of fluid ensures that when the valve is opened fluid having characteristics consistent with that of the fluid source flows immediately from the valve.

There are many devices available for supplying fluid, e.g. water. Typical commercial embodiments exist in most dwellings in the form of sinks and showers. These conventional devices require that in order to dispense hot sourced water from a water heater, the piping connecting the heater to the valve be cleared of standing water. In order to clear this standing water, the valve must remain open for a length of time before hot water will flow from the valve. This problem is especially common in cooler climates where the ambient temperature can be quite low. Considerable time and water is often wasted while a user waits for hot water to flow from the sink or shower.

In conventional systems, fluid is not recycled through the fluid source when all potential outgoing sources of water (i.e., valves) are closed. Fluid in a conventional device may remain near a closed valve for an extended period of time and be effected by temperature and/or time causing the fluid to become unheated and/or precipitate out of solution.

While conventional systems are generally effective for supplying fluid, the apparatus of the present invention is desirable for a number of reasons including time and fluid savings. For the foregoing reasons, there is a need for an apparatus for supplying fluid that allows fluid to be continuously cycled through the fluid source.

SUMMARY OF INVENTION

According to this invention, an apparatus for supplying fluid is provided that comprises a fluid source, valve, inside tube and outside tube. One end of the outside tube is in open communication with the fluid source and the opposite end is in open communication with the valve. The inside tube is in open communication with the fluid source on one end while the opposite end is located near the valve. The inside tube is positioned within the outside tube such that their internal volumes are substantially in alignment with one another. In one embodiment, the fluid located within the fluid source is at a temperature significantly higher than the ambient air temperature in which the apparatus is located. When the valve is closed warm lower density fluid travels through the inside tube and displaces cool higher density fluid near the valve. The displaced higher density cool fluid flows from the area near the valve back to the fluid source in a fluid return path defined between the inside surface of the outside tube and the outer surface of the inside tube. Circulation continues until thermal equilibrium is reached between the fluid in the fluid source and the ambient air where the apparatus is located.

In another embodiment of the invention, the inside tube may be made of an insulating material in order to prevent heat loss from the fluid traveling upward within the inside tube.

In another embodiment of the invention, the apparatus further comprises a heater placed in thermal communication with the fluid source for heating the fluid contained within the fluid source to a desired temperature. A commercial example of a fluid source having a heater in thermal communication with the fluid source is a conventional water heater. In this embodiment, circulation is continuous and indefinite so heated fluid remains near the valve when the valve is closed. When the valve is opened heated fluid flows immediately or nearly immediately through the valve.

In another embodiment of the invention, the inside tube may have an intake funnel on the end within the fluid source. The intake funnel is located in close proximity the heater.

In another embodiment of this invention, the apparatus further comprises a pump instead of a heater and is placed in communication with only the fluid source and inside tube in order to force fluid through the inside pipe to the area near the valve. The fluid pumped from the fluid source displaces fluid from the area near the valve. The displaced fluid travels through the fluid return path located between the inside tube and outside tube so that the displaced fluid returns back to the fluid source. The addition of a pump turns the apparatus from passive to active such that fluid having characteristics, e.g. thermal, salinity, acidity, slurry density etc., similar to fluid in the fluid source remains in the area near the valve.

In another embodiment of this invention, the apparatus further comprises a pump and a heater. The addition of the pump in this embodiment creates an active apparatus such that heated fluid from the fluid source is forcibly circulated to the area near the valve.

In another embodiment of this invention, the apparatus for supplying fluid comprises a fluid source, a heater and/or pump, an inner and outer main tube and a plurality of outside and inside branch tubes so that fluid from a single fluid source can be continuously circulated to multiple valves when all valves are closed.

The present invention in all embodiments provides the advantage of supplying fluid having characteristics similar to that of fluid located in the fluid source when a valve has been closed for an extended period of time.

These and other features, aspects, and advantages of the present invention will become better understood when read in conjunction with the following description, claims, and accompanying drawings.

DESCRIPTION OF THE PREFERRED EMBODIMENT

Like numerals are employed to designate like parts throughout the drawings. Various items of equipment such as fasteners, fittings, etc., are omitted so as to simplify the description. However, those skilled in the art will realize that such conventional equipment can be employed as desired.

Figure 1:
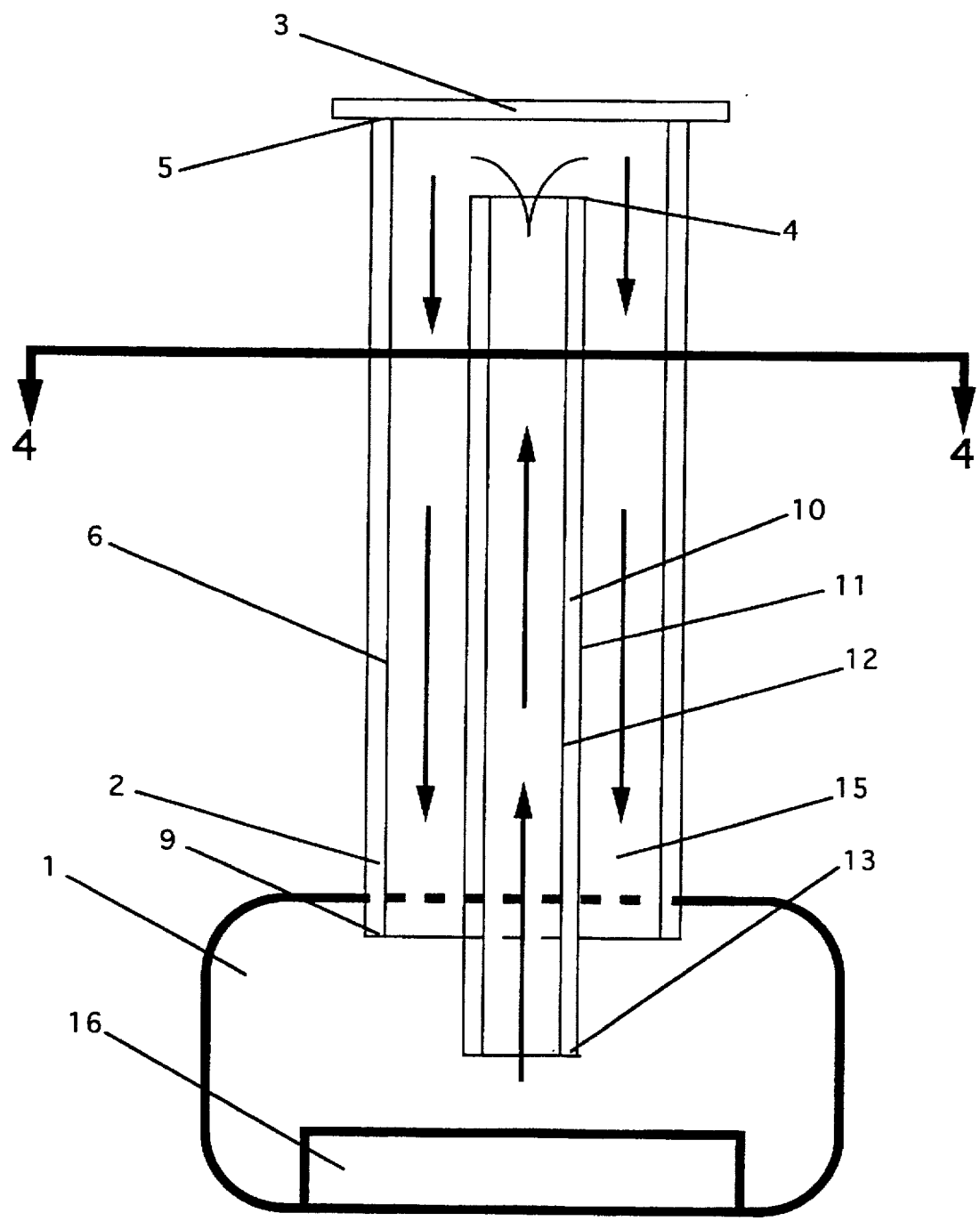
FIG. 1 is a sectional view of an apparatus for supplying fluid having a heater.

As shown in FIG. 1, the apparatus for supplying fluid comprises a fluid source 1, a valve 3, an outside tube 2 and an inside tube 10. Outside tube 2 has a first end 5, a second end 9 and an inside surface 6. First end 5 of outside tube 2 is in open communication with valve 3. Second end 9 of outside tube 2 is in open communication with fluid source 1. Inside tube 10 is located within outside tube 2, preferably in concentric alignment, and has a first end 13 in open communication with fluid source 1. In addition, inside tube 10 has a second end 4 spaced apart from valve 3 as well as an inner surface 12. Fluid return path 15 is defined between inside surface 6 of outside tube 2 and outer surface 11 of inside tube 10. It is crucial that both inside tube 10 and outside tube 2 are aligned as they leave communication with the fluid source 1 such that gravity forces cool higher density fluid located in the fluid return path 15 back into fluid source 1.

Fluid source 1 can be a variety of conventional items including gas under pressure, a water heater, or a beverage dispenser among others.

Valve 3 can be any conventional device including but not limited to a sink, shower, beverage dispenser or any device where fluid is supplied.

Outside tube 2 can be any conventional tube which is part of an existing piping system. The existing system may be altered to become the apparatus of the present invention or the apparatus can be created as part of a new piping system. Inside tube 10 is preferably made of an insulating material. In addition, inside tube 10 may be, and preferably is, flexible when an existing piping system is modified to become the apparatus of the present invention. Both the inside tube 10 and outside tube 2 are aligned as they leave fluid source 1 and can extend into fluid source 1 either individually or in combination.

Due to the absence of a pump or other means for continuously circulating the fluid, the temperature of the fluid within fluid source 1 must be higher than the ambient air temperature where the apparatus is located. When valve 3 is closed warm lower density fluid travels upward from fluid source 1 through inside tube 10 toward valve 3. The warm lower density fluid travels away from fluid source 1 through inside tube 10 instead of outside tube 2 due to the exposure of outside tube 10 to cooler ambient conditions. This exposure causes fluid near valve 3 and in fluid return path 15 to lose heat and increase in density. The warm lower density fluid displaces cool higher density fluid near valve 3. The displaced higher density fluid is forced downward by gravity to fluid source 1 through fluid return path 15 defined by inside surface 6 of outside tube 2 and outer surface 11 of inside tube 10. Upon returning to fluid source 1, the displaced fluid gains energy by mixing with fluid in fluid source 1 such that the density is reduced and it again flows through inside tube 10 to the area near valve 3. There is continuous circulation of low density fluid from fluid source 1 through inside tube 10 to the area near valve 3 and then back to fluid source 1 because the fluid cools to a higher density in fluid return path 15. The circulation of fluid through fluid source 1 takes place when valve 3 is closed for extended periods of time.

Figure 4:
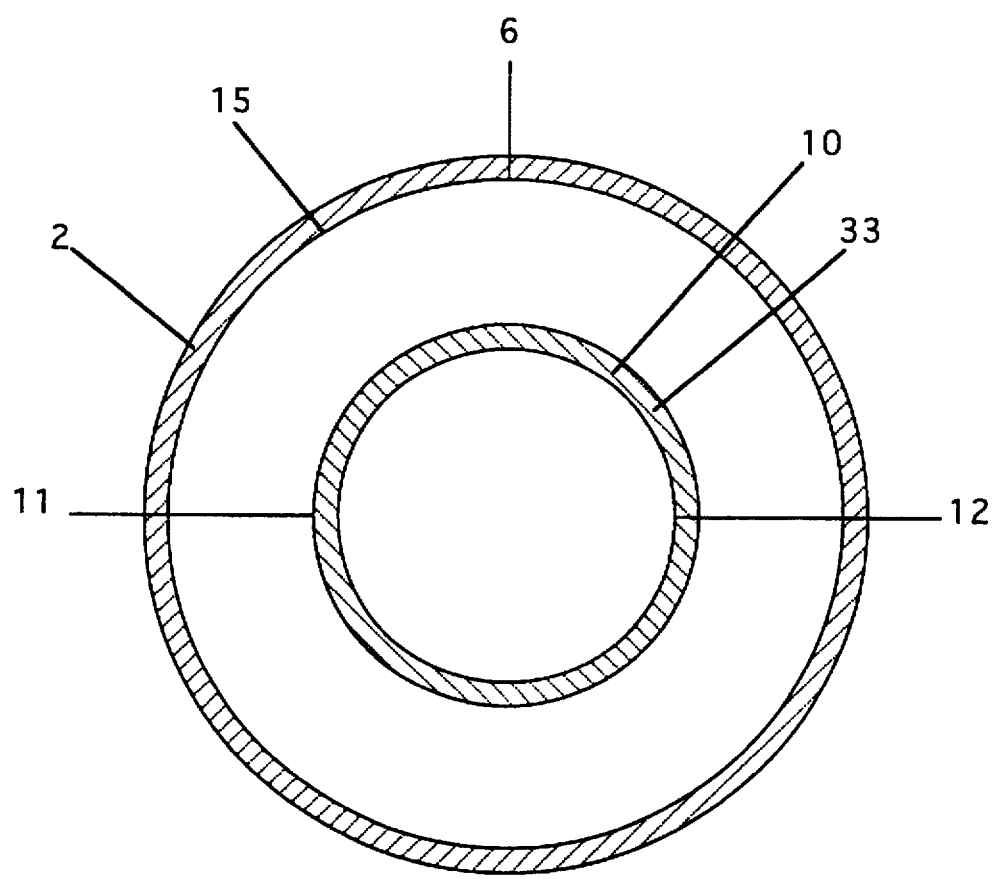
FIG. 4 is a sectional view taken along line 4—4 where the inside tube has a chamber between the inner surface and the outer surface.

The apparatus of the present invention is a passive system that continuously circulates fluid through fluid source 1 until a state of thermal equilibrium between the fluid in the fluid source and the ambient air is achieved. The efficiency of the apparatus and therefore the rate of circulation is reduced as the fluid in fluid source 1 and ambient air near thermal equilibrium. Inside tube 10 is preferably made of an insulating material or has a chamber 33 between inner surface 12 and outer surface 11 (shown in FIG. 4) so that the effect of the ambient air temperature on fluid within inside tube 10 is minimized and the fluid from fluid source 1 does not lose heat as it approaches the area near valve 3. The effects of the ambient air temperature on fluid within inside tube 10 will be minimized if inside tube 10

As shown in FIG. 1, in another embodiment of this invention, a heater 16 is added to maintain the temperature of the fluid within fluid source 1. Heater 16 can be any conventional heating device that supplies energy to fluid source 1 so that the fluid within fluid source 1 is maintained at a desired temperature. Heater 16 may be as simple as a heating element in a water heater as long as heater 16 is in thermal communication with fluid source 1. This embodiment of the invention is also a passive system. No mechanical force is exerted on any fluid. The circulation of the fluid from fluid source 1 through inside tube 10 and then back through fluid return path 15 occurs as a result of the temperature gradient maintained between the fluid in fluid source 1 and the ambient air where valve 3 and outside tube 2 are located. Heated lower density fluid flows up from fluid source 1 through inside tube 10 to the area near valve 3 and the unheated higher density fluid is forced down fluid return path 15 by gravity to fluid source 1 where it is reheated to the desired temperature.

The efficiency of the apparatus in this embodiment will be directly related to the temperature gradient maintained between the ambient air where the valve and outside tube are located and the temperature of the fluid in the fluid source as well as the distance from the fluid source to the valve. This embodiment of the present invention supplies fluid at a desired temperature immediately or nearly immediately upon the opening of a valve. Fluid will circulate indefinitely as long as the heater maintains a temperature gradient between the fluid in the fluid source and the ambient air where the apparatus is located. Use of this apparatus would allow for hot water to be immediately or nearly immediately received from a faucet or shower so that time and water may be saved.

Figure 2:
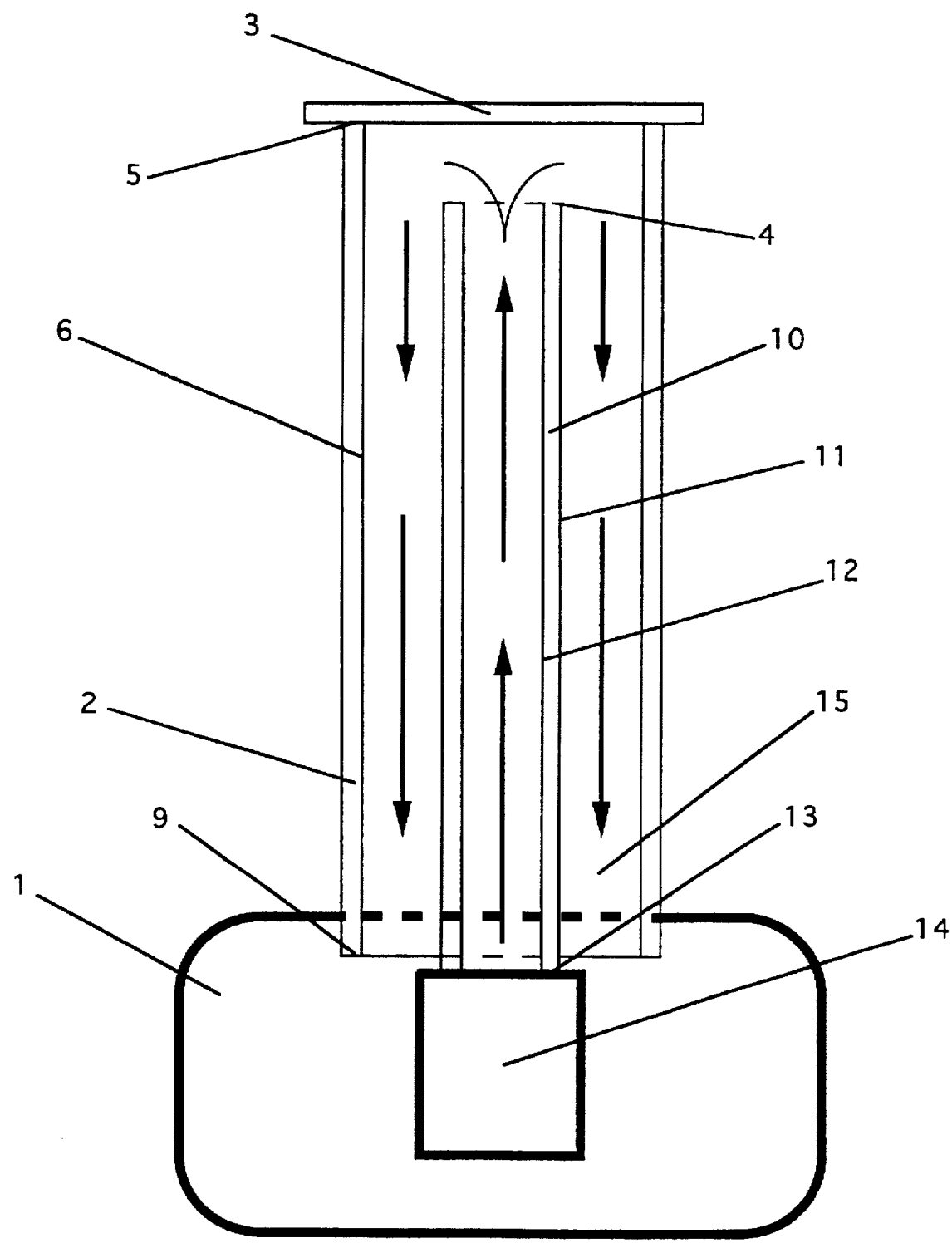
FIG. 2 is a sectional view of an apparatus for supplying fluid having a pump.

In another embodiment of this invention, as shown in FIG. 2, heater 16 is replaced by pump 14. Pump 14 is placed in communication only with fluid source 1 and first end 13 of inside tube 10. There are applications where heating the fluid in fluid source 1 may not be necessary but it is still desired that fluid from fluid source 1 is continuously circulated to an area near valve 3. Examples may include beverages which precipitate out of solution, or any type of solution where time has a diminishing effect on the quality of the fluid being supplied. Many slurries will precipitate after time in the absence of agitation. Pump 14 continuously cycles fluid through inside tube 10 to the area near valve 3 allowing fluid fresh from fluid source 1 to be maintained near valve 3. There may be situations where a solution will harden if allowed to remain standing within a tube in the absence circulation. Such hardening within a tube may damage or plug tubes leading to costly repairs.

Addition of pump 14 converts the apparatus from a passive device to an active device by forcing fluid from fluid source 1 through inside tube 10 to the area near valve 3. The displaced fluid is forced from the area near valve 3 and returns through fluid return path 15 to fluid source 1. Pump 14 may be required if the temperature gradient between the fluid in fluid source 1 and the ambient air where the apparatus is located is minimal, or valve 3 is located a great distance from fluid source 1.

The location of pump 14 is not critical but it must be in communication only with fluid source 1 and inside tube 10. The density of the fluid in this embodiment is a nominal factor at most because pump 14 makes this an active apparatus where fluid is mechanically forced through inside tube 10.

In another embodiment of this invention, there is a plurality of inside tubes located within the outside tube. Each inside tube is aligned within the outside tube and has one end in open communication with the fluid source. The opposite end of each inside tube is spaced near the valve. A fluid return path is defined between the inner surface of the outside tube and the outer surfaces of each inside tube.

Figure 3:
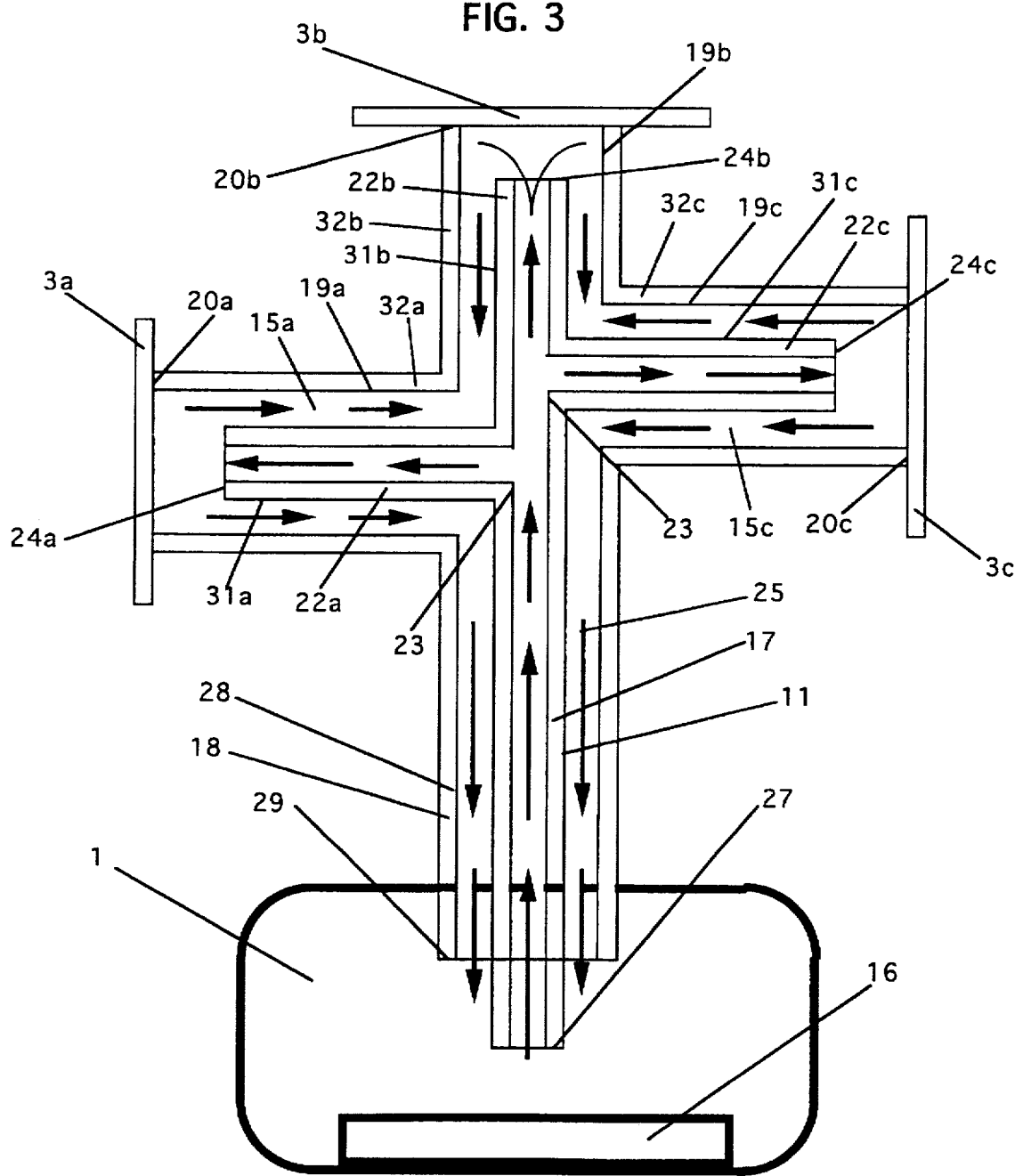
FIG. 3 is a sectional view of an apparatus for supplying fluid having a heater, a plurality of inside tubes, a plurality of outside tubes and valves.

In another embodiment of this invention, as shown in FIG. 3, the apparatus contains a fluid source 1, a heater 16, a plurality of valves 3a, 3b, 3c an inner main tube 17, an outer main tube 18, a plurality of inside branch tubes 22a, 22b, 22c and a plurality of outside branch tubes 32a, 32b, 32c. This apparatus is similar to previous embodiments but allows for heated fluid from a single fluid source 1 to be circulated near several valves 3a, 3b, 3c when each valve 3a, 3b, 3c is closed for an extended period of time. As with other embodiments, fluid is heated within fluid source 1 by heater 16. Lower density heated fluid rises from fluid source 1 through inner main tube 17. The lower density heated fluid leaves inner main tube 17 at several locations through a plurality of inside branch tubes 22a, 22b, 22c displacing cool higher density fluid at several valve 3a, 3b, 3c locations. The displaced cool higher density fluid returns to fluid source 1 via minor fluid return paths 15a, 15b, 15c located between inner surfaces 19a, 19b, 19c of outside branch tubes 32a, 32b, 32c and outer surfaces 31a, 31b, 31c of inside branch tubes 22a, 22b, 22c to major fluid return path 25 located between inside surface 28 of outside main tube 18 and outside surface 11 of inner main tube 17. The fluid travels back down major fluid return path 25 to fluid source 1 for reheating to a desired temperature. This apparatus is a passive device that continuously circulates fluid from fluid source 1 to several different locations near valves 3a, 3b, 3c using only one fluid source 1. Common examples of where this embodiment could be applied exist in every house, apartment or office building where there are several sinks or showers. The effectiveness of this apparatus is determined by the temperature gradient between the fluid in fluid source 1 and the ambient air where valves 3a, 3b, 3c, outer main tube 18 and outside branch tubes 32a, 32b, 32c are located as well as the distance of each valve 3a, 3b, 3c from fluid source 1.

Figure 5:
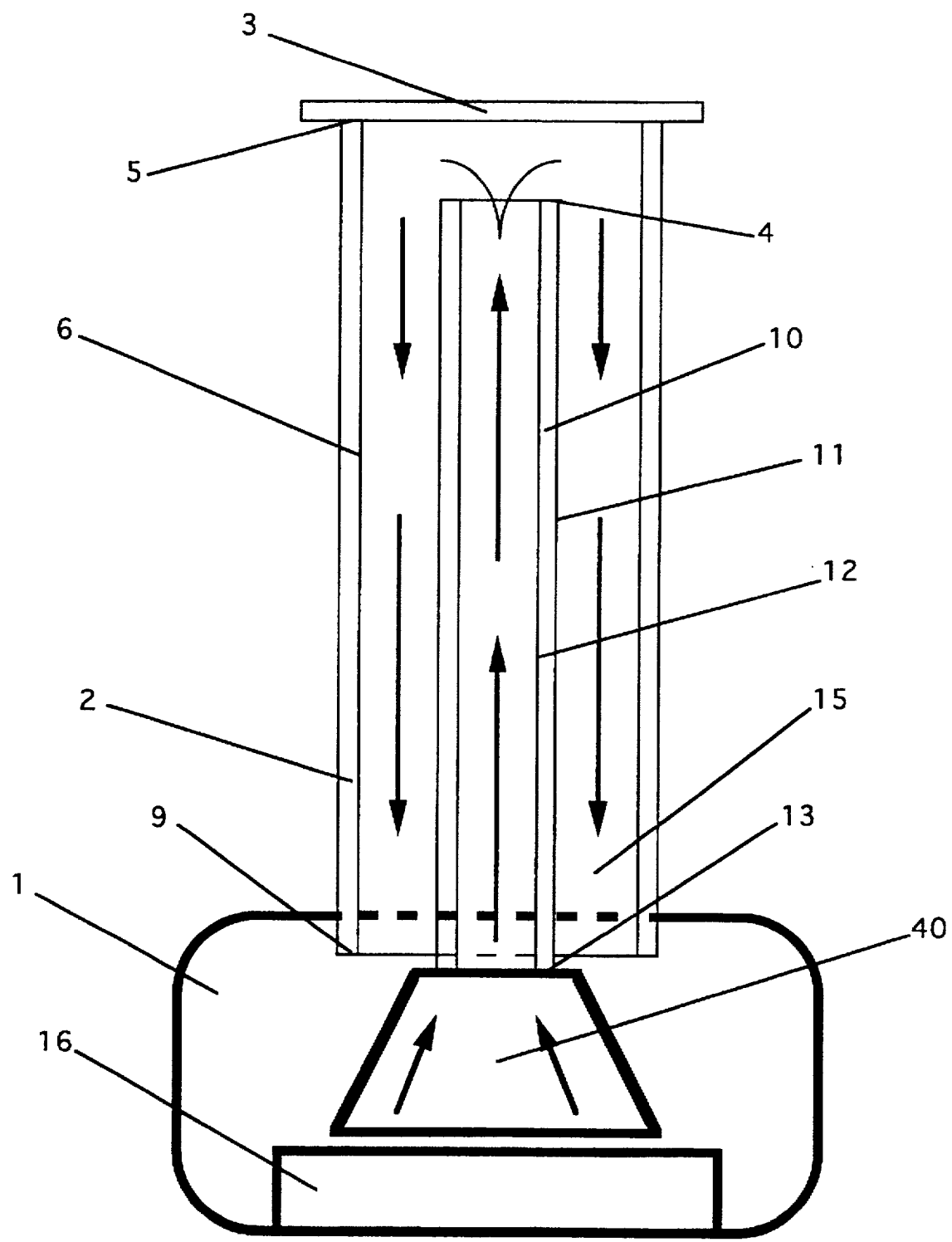
FIG. 5 is a sectional view of an apparatus for supplying fluid having an intake funnel on the inside tube located near the heater.

In another embodiment of this invention, as shown in FIG. 5, an intake funnel 40 may be added to the embodiment having heater 16. Intake funnel 40 is at first end 13 of inside tube 10 located within fluid source 1. The opening of intake funnel 40 is placed near heater 16 to increase the efficiency of the apparatus.

In another embodiment of this invention a pump may be added to the embodiment having a plurality of valves and a heater. The pump is in communication only with the fluid source and the inner main tube so that fluid is forced through the inner main tube to the plurality of inside branch tubes displacing unheated fluid near each valve. The use of this pump to create an active system may be necessitated by either a minimal temperature gradient between the fluid source and the ambient air where the apparatus is located, or there is a large number of valves a significant distance from the fluid source. The density of the fluid is a nominal factor at most when a pump is used to mechanically force fluid through the inner main tube.

An important advantage of this invention is that existing piping systems can be altered to effectively become like the apparatus of this invention. Insertion of an inside tube into an existing system extending from the fluid source to an area near the valve creates the apparatus of this invention. Depending on the shape of the existing piping system and whether or not a flexible material is used for the inside tube, the apparatus of this invention can be created in an existing system without great expense or difficulty by simply inserting an inside tube through one end of the outside tube so that the inside tube is in open communication with a fluid source at one end and spaced near a valve on the opposite end.

There currently exists many piping systems where a user must wait an extended period of time for hot water to begin flowing from a valve and this apparatus solves the problem by allowing a user to receive hot water immediately or nearly immediately upon the opening of a valve.

Although the present invention has been described in considerable detail with reference to certain preferred versions thereof, other versions are possible. The apparatus of the present invention may be with or without a pump, with or without a heater and/or have a plurality of valves serviced by one fluid source.

What is claimed is:

1. An apparatus for supplying and continuously circulating fluid comprising:

a) a fluid source containing a fluid which is warmer than the environment in which the apparatus is located;

b) a valve;

c) an outside tube having a first end, a second end and an inside surface, the first end in open communication with the valve and the second end in open communication with the fluid source;

d) an inside tube located within the outside tube having a first end, a second end, an inner surface and an outer surface, the first end in open communication with the fluid source, and the second end is spaced from the valve so that a fluid return path is defined between the inside surface of the outside tube and the outer surface of the inside tube;

e) whereby warmer fluid travels up from the first end through the inside tube to displace cooler fluid near the valve so that when the valve is opened warmer fluid flows immediately through the valve and when the valve is closed the displaced cooler fluid flows from the area near the valve to the fluid source through the fluid return path.

2. The apparatus of claim 1 further comprising
a heater in thermal communication with the fluid source for heating fluid in the fluid source.

3. The apparatus of claim 2 wherein the first end of the inside tube has an intake funnel located near the heater.

4. The apparatus of claim 2 wherein the fluid is water.

5. The apparatus of claim 4 wherein the fluid source and the heater comprise a water heater.

6. The apparatus of claim 1 wherein the inside tube has a chamber between the inner surface and the outer surface of the inside tube.

7. The apparatus of claim 1 wherein the inside tube is made of a thermal insulating material.

8. The apparatus of claim 1 wherein the inside tube is made of a flexible material.

9. Apparatus of claim 1 wherein the inside tube and the outside tube are in concentric alignment.

10. Apparatus of claim 1 further comprising a pump in communication with the fluid source and the first end of the inside tube for forcing fluid from the fluid source through the inside tube whereby fluid from the fluid source displaces fluid at the second end of the inside tube and the displaced fluid returns to the fluid source through the fluid return path.

11. An apparatus for supplying and continuously circulating fluid comprising:
   a) a fluid source;
   b) a plurality of valves;
   c) an outer main tube having a return end and an inside surface, the return end in open communication with the fluid source;
   d) an inner main tube having an outer surface located within the outer main tube defining a major fluid return path between the inside surface of the outer main tube and the outer surface of the inner main tube, the inner main tube having a source end in open communication with the fluid source;
   e) a plurality of outside branch tubes each having a first end in open communication with a valve, and each having a second end in open communication with the outer main tube, each outside branch tube having an inside surface;
   f) a plurality of inside branch tubes, at least one inside branch tube located within an outside branch tube, each inside branch tube having a first end, a second end and an outer surface, each first end in open communication with the inner main tube and each second end spaced apart from a valve in order to define a minor fluid return path located between the inside surface of each outside branch tube and the outer surface of each inside branch tube;
   g) a heater in thermal communication with the fluid source for heating fluid in the fluid source;
   h) whereby heated fluid travels from the fluid source through the source end of the inner main tube to the second ends of the plurality of inside branch tubes displacing unheated fluid near each valve so that when a valve is opened heated fluid flows immediately through the valve and when every valve is closed the displaced unheated fluid flows from the area near each valve through the minor fluid return paths to the major fluid return path to return to the fluid source.

12. The apparatus of claim 11, further comprising a pump in open communication with the fluid source and the inner main tube for forcing fluid from the fluid source through the inner main tube whereby heated fluid from the fluid source displaces unheated fluid near each valve when the valves are closed, the displaced unheated fluid flows from the area near each valve through the minor fluid return paths to the major fluid return path to return to the fluid source.

* * * * *